(12) United States Patent
Yasuda (10) Patent No.: US 8,033,263 B2
(45) Date of Patent: Oct. 11, 2011

(54) CYLINDER HEAD GASKET

(75) Inventor: Kishou Yasuda, Tokyo (JP)

(73) Assignee: Ishikawa Gasket Co., Ltd., Minato-Ku, Tokyo (JP)

( * ) Notice: Subject to any disclaimer, the term of this patent is extended or adjusted under 35 U.S.C. 154(b) by 0 days.

(21) Appl. No.: 12/923,700

(22) Filed: Oct. 5, 2010

(65) Prior Publication Data
US 2011/0024992 A1  Feb. 3, 2011

Related U.S. Application Data

(63) Continuation of application No. 12/071,545, filed on Feb. 22, 2008, now Pat. No. 7,905,211.

(30) Foreign Application Priority Data

Feb. 22, 2007  (JP) .................. 2007-042213

(51) Int. Cl.
*F02B 75/22* (2006.01)
*F02F 3/00* (2006.01)
(52) U.S. Cl. .................. 123/195 R; 277/595

(58) Field of Classification Search ............. 123/193.1, 123/195 R, 41.82 R; 277/592, 593, 595, 277/598, 600
See application file for complete search history.

(56) References Cited

U.S. PATENT DOCUMENTS
4,300,779 A * 11/1981 DeCore et al. ............. 277/601
* cited by examiner

*Primary Examiner* — Noah Kamen
(74) *Attorney, Agent, or Firm* — Manabu Kanesaka

(57) ABSTRACT

A cylinder head gasket is installed in an open-deck engine. The cylinder head gasket includes a first metal plate, a second metal plate having an inner portion disposed on a folded portion of the first metal plate and an outer portion outside the folded portion, an annular bead plate, and an intermediate plate provided between the outer portion of the second metal plate and a base portion of the first metal plate and having a half bead extending from an inner periphery of the inner end portion toward the base portion of the first metal plate. A cylindrical portion of the open-deck engine has a thickness partly changing between inner and outer peripheries thereof. The inner periphery of the intermediate plate is located on the cylinder portion along the outer periphery, a distance of the outer periphery from the inner periphery changing according to the thickness of the cylindrical portion.

5 Claims, 7 Drawing Sheets

CYLINDER HEAD GASKET

CROSS-REFERENCE TO RELATED APPLICATION

This is a continuation application of Ser. No. 12/071,545 filed on Feb. 22, 2008, which is patented as U.S. Pat. No. 7,905,211.

BACKGROUND OF THE INVENTION AND RELATED ART STATEMENT

The present invention relates to a cylinder head gasket sandwiched between a cylinder head and a cylinder block of an open-deck type engine and sealing therebetween.

The cylinder head gasket is sandwiched between engine members such as the cylinder head and the cylinder block (cylinder body) and the like of an automobile engine and tightened by head bolts, thereby sealing fluid such as combustion gas, oil, coolant water and the like.

Figure 12:
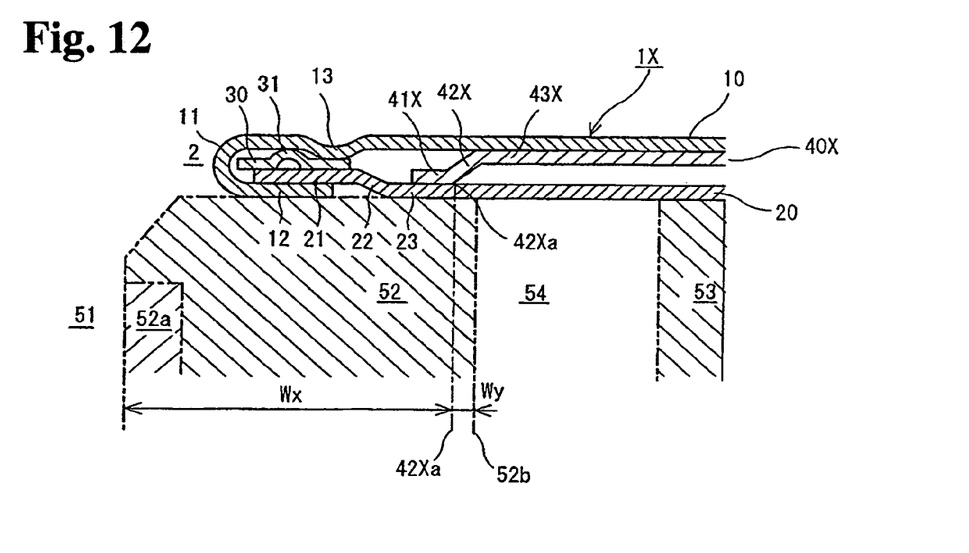
FIG. 12 is a cross sectional view taken along line 12-12 in FIG. 11 showing the cylinder head gasket as a reference.

On the other hand, if the engines are distinguished based on a type of the cylinder block, there are a closed-type engine which does not have a coolant water channel on a contact surface between the cylinder block and the cylinder head, and an open-deck type engine wherein the contact surface between the cylinder block and the cylinder head is open to be used as a coolant liquid channel. As shown in FIG. 12, the open-deck type engine includes a coolant liquid channel (water jacket) 54 near the cylinder head of an engine block 52, so that it has an advantage in terms of a cooling performance and reduction in weight. Furthermore, since there is an opening, it can be easily manufactured.

Regarding the cylinder head gasket for the open-deck type engine, a metal gasket has been proposed (for example, refer to Japanese Patent Publication (TOKKAI) No. H10-281290). The metal gasket provides a grommet along the inner periphery of a cylinder hole in a plate which covers both a cylindrical portion of the cylinder block and an outer wall portion forming the outside of the coolant water channel; seals the combustion gas of a cylinder bore at the thickest portion of the grommet formed in the inner side of a cylinder sleeve; and also seals the coolant water by a step bead formed on both sides of the coolant water channel.

In this cylinder head, the step bead is provided for sealing the coolant water between the coolant water channel and the cylinder bore. However, a position of an angular portion of the step bead is located on the inner peripheral side of a wall surface (the outer wall surface of the cylindrical portion) of the coolant water channel, and the coolant water contacts the upper surface of a cylinder liner (cylindrical portion). Therefore, an electric etching occurs at the contact surface of the cylinder block due to contact with liquid coolant water containing anti-freezing liquid (LLC) to aluminum alloy, so that the sealing performance of the portion tends to be deteriorated.

If the sealing performance between the cylinder bore and the coolant water channel is deteriorated, the combustion gas enters the coolant water channel, and a circulation of the coolant water is hindered. This causes a major engine trouble. Therefore, sealing a cylinder bore side becomes more important than the sealing of a bolt hole side or an external portion side. In order to prevent the electric etching, it is important to prevent a coolant liquid in the coolant liquid channel from directly contacting the upper surface of the cylinder liner. Conventional technology was not good enough to prevent the electric etching caused by the contact of the coolant water with anti-freezing liquid, and did not focus on the relationship with the coolant water channel, even though a seal line is provided. As a result, the contact of the coolant liquid to the upper surface of the cylinder liner could not be fully prevented.

The present invention has been made in order to solve the problems described above. An object of the present invention is to provide a cylinder head gasket for the open-deck type engine, and prevent the electric etching, which occurs due to the contact of the coolant water with anti-freezing liquid on the upper surface of the cylindrical portion forming the cylinder bore, and improve the sealing performance.

Further objects and advantages of the invention will be apparent from the following description of the invention.

SUMMARY OF THE INVENTION

In order to achieve the object described above, in a cylinder head gasket according to the invention, which is sandwiched between an open-deck type cylinder block and a cylinder head, and performs a sealing function, a first metal plate forms a folded portion at the peripheral border portion of a cylinder bore. A second metal plate is placed inside the folded portion by inserting an inner-periphery side flat portion of the second metal plate. In the second metal plate, a first half bead is formed on the outer periphery side of the inner-periphery side flat portion so that the flat portion on the outer peripheral side of the first half bead is placed on the folded portion side. In addition, inside the folded portion, a circular or annular bead plate, including a first full bead projecting to a first metal plate side, is laminated between the inner peripheral side flat portion of the second metal plate and the first metal plate.

Also, an intermediate plate with a second half bead is placed between the outer-periphery side flat portion and the first metal plate. The second half bead slopes from a second metal plate side to the first metal plate side as the second half bead goes to the outer peripheral side from the inner peripheral side. The inner peripheral side of a sloping portion of the second half bead is disposed to correspond to a vicinity of the outer peripheral side of an inner cylindrical portion forming the cylinder bore of the cylinder block, or along the inner peripheral of the inner cylindrical portion.

Also, in the cylinder head gasket, a second full bead may be provided between the first full bead and the second half bead on the first metal plate to project to the folded portion side.

Alternatively, in the cylinder head gasket, a third metal plate is laminated on the first metal plate. The third metal plate includes a third full bead in a position facing the first full bead of the bead plate, and a third half bead in a position facing the second half bead of the intermediate plate.

Alternatively, in order to achieve the object described above, in the cylinder head gasket according to the invention, which is sandwiched between the open-deck type cylinder block and the cylinder head, and performs the sealing function, the first metal plate forms the folded portion at the peripheral border portion of the cylinder bore. The second metal plate is inserted into the folded portion. In the folded portion, the circular or annular bead plate, including the first full bead projecting to the first metal plate side, is laminated between the first and second metal plates. Also, the intermediate plate with the second half bead is laminated on the outer peripheral side of the bead plate, and the second half bead slopes from the first metal plate side to the second metal plate side as the second half bead goes to the outer peripheral side from the inner peripheral side.

Moreover, in the cylinder head gasket, a fourth metal plate is laminated on the folded portion side of the first metal plate. The fourth metal plate includes a fourth full bead which projects to the bead plate side in a position facing the first full bead of the bead plate, and a fourth half bead formed in the position facing the second half bead of the intermediate plate and slopes from the folded portion side of the first metal plate side to the second metal plate side as the fourth half bead goes to the outer peripheral side from the inner peripheral side. The inner peripheral side of the sloping portion of the fourth half bead is disposed to correspond to the outer peripheral side of the inner cylindrical portion forming the cylinder bore of the cylinder block, or along the inner peripheral of the inner cylindrical portion.

Also, in the cylinder head gasket, a fifth metal plate is laminated on the first metal plate, and the fifth metal plate has a fifth full bead projecting to the bead plate side in a position facing the first full bead of the bead plate.

According to the cylinder head gasket of the invention, the inner peripheral side of the sloping portion of the second or fourth half bead is disposed to correspond to the outer peripheral side of the inner cylindrical portion forming the cylinder bore of the cylinder block, or along the inner peripheral of the inner cylindrical portion. Accordingly, while the sealing performance between a coolant water channel and the cylinder bore is maintained, a contact portion with the anti-freezing liquid on the upper surface of the cylindrical portion forming the cylinder bore can be decreased and the contact of the anti-freezing liquid can be prevented. As a result, the electric etching, which occurs due to the anti-freezing liquid on the above-mentioned portion, can be prevented, and the sealing performance can be improved. Also, since a pressing force from the second or fourth half bead is generated along the outer peripheral of the inner cylindrical portion, stress generated in the inner cylindrical portion can be optimized.

DETAILED DESCRIPTION OF THE PREFERRED EMBODIMENTS

Hereunder, embodiments of a cylinder head gasket according to the present invention will be described with reference to the attached drawings. Incidentally, FIGS. 1 to 14 are schematic explanatory views in which sizes of sealing bores, cylinder liners, water holes and beads, shapes and so on are different from actual ones and enlarged for convenience.

As shown in FIGS. 2, 3, 5, 6, cylinder head gaskets 1, 1A of the embodiment of the invention are a metal gasket which is held between engine members, i.e. a cylinder head and a cylinder block (cylinder body), for an open-deck type engine for a multi-cylinder engine, and seals high-temperature and high-pressure combustion gas in a cylinder bore, and a fluid such as coolant water or oil and the like in a coolant water channel or a coolant oil channel and the like.

In the open-deck type engine wherein the cylinder head gaskets 1, 1A are used, as shown in FIGS. 1, 4, 7, 14, a cylinder block 50 is formed of a cylindrical portion (block liner) 52 wherein cylinder bores 51 are provided; and an outer wall portion 53. Also, a coolant water channel (water jacket) 54 is formed between the cylindrical portion 52 and the outer wall portion 53. The outer wall portion 53 has water holes 55, oil holes 56 and bolt holes 57 for fastening bolts, and the cylindrical portion 52 also has the water holes 55.

In the cylinder block 50 of the open-deck type engine, the coolant water channel 54 is open on the contact surface to the cylinder head, so that it is difficult to maintain rigidity and the bore can be easily deformed. However, it has the advantage in cooling performance and also can be easily casted. Also, in the cylindrical portion 52, cylinder sleeves (cylinder liners) 52a are fitted to a cylinder bores 51 side. The cylinder sleeves 52a are made of special cast iron which is excellent in terms of abrasion quality, seize resistance, heat resistance and strength. The cylindrical portion 52 and the outer wall portion are formed of aluminum alloy which has an excellent lightweight property.

Figure 2:
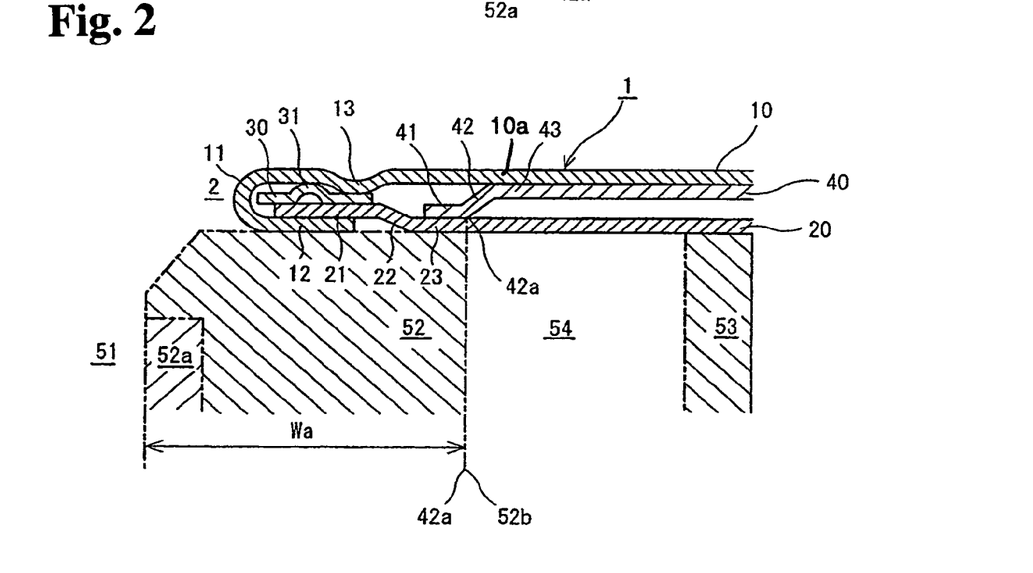
FIG. 2 is a cross sectional view taken along line 2-2 in FIG. 1 showing the cylinder head gasket of the first embodiment of the present invention.
Figure 3:
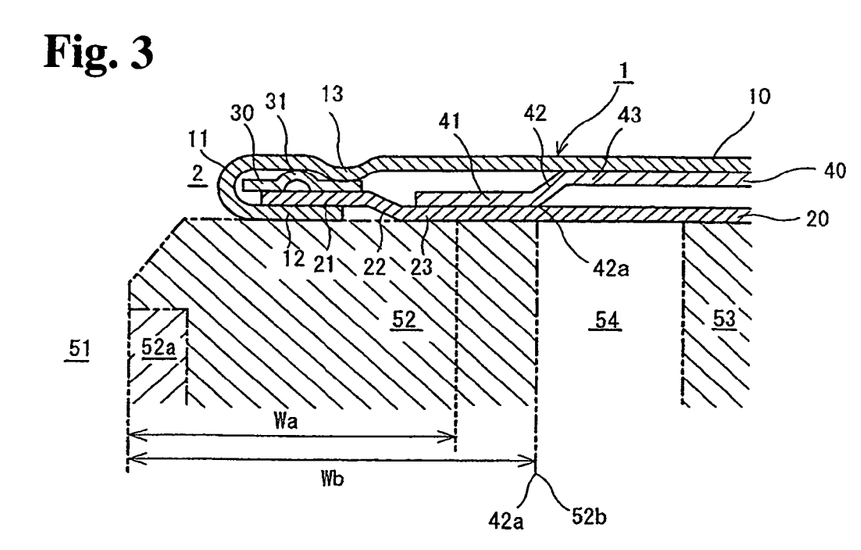
FIG. 3 is a cross sectional view taken along line 3-3 in FIG. 1 showing the cylinder head gasket of the first embodiment of the present invention.

As shown in FIGS. 2, 3, the cylinder head gasket 1 of the first embodiment includes a first metal plate (metal plate: metal structural plate) 10, a second metal plate 20, a bead plate 30 and an intermediate plate 40. The first and second metal plates 10, 20, the bead plate 30 and the intermediate plate 40 are made of soft steel, annealed stainless (annealed material), or thermal refining stainless material (spring steel). Especially, the first metal plate 10 is made of annealed material which has an excellent heat resistance or corrosion resistance. The bead plate 30 is made of spring material which has an excellent elasticity.

Also, these metal plates 10, 20, 40 are manufactured in accordance with a shape of the engine members such as the cylinder block and the like, and form cylinder bores (combustion chamber holes) 2, water holes for circulating coolant water (not shown), oil holes for circulating lubricant oil (not shown), head bolt holes for fastening head bolts (not shown) and the like.

As shown in FIGS. 2, 3, the first metal plate 10 is folded back at the peripheral border portion of the cylinder bore 2, and forms a curved portion 11 and a folded portion (a flange portion) 12. The second metal plate 20 is formed by inserting an inner-periphery side flat portion 21 of the second metal plate 20 into the folded portion 12. In the second metal plate 20, a first half bead 22 is provided on the outer periphery side of the inner-periphery side flat portion 21 and slopes toward a folded portion 12 side as the first half bead 22 goes to the outer periphery side. An outer-periphery side flat portion 23 of the first half bead 22 is placed at the same level as the folded portion 12 in a surface thickness direction.

Also, inside the folded portion 12, the circular or annular bead plate 30 is laminated between the inner-periphery side flat portion 21 of the second metal plate 20 and a base portion 10a the first metal plate 10. The bead plate 30 includes a first full bead 31 which projects to the base portion 10a of the first metal plate 10. Also, the intermediate plate 40 is laminated between the outer-periphery side flat portion 23 and the base portion 10a of the first metal plate 10. The intermediate plate 40 is provided with a second half bead 42 which slopes from a second metal plate 20 side to the first metal plate 10 side as the second half bead 42 goes from the inner peripheral side to the outer peripheral side. An inner-peripheral side flat portion 41 which is formed on the inner peripheral side of the second half bead 42 is placed on the outer peripheral side of the first half bead 22. Also, between the first full bead 31 and the second half bead 42, a second full bead 13 which projects to the folded portion 12 is provided in base portion 10a of the first metal plate 10.

Figure 1:
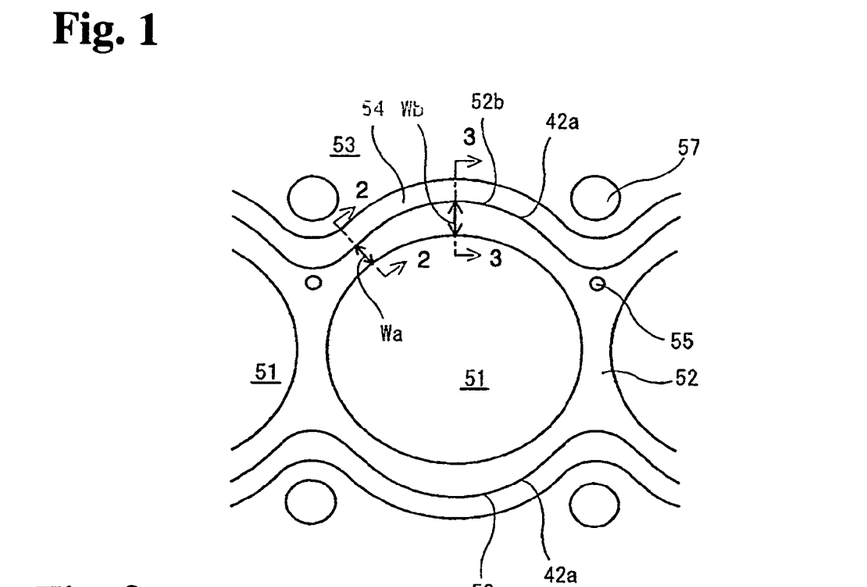
FIG. 1 is a partial top plan view of a cylinder block of an open-deck type engine for explaining a structure of a cylinder head gasket of the first embodiment of the present invention.

Also, the cylindrical portion 52 has a non-uniform thickness. As shown in FIGS. 1-3, the distance Wa is small at a vicinity of the bolt holes 57. However, the distance Wb becomes larger in a central part between the respective bolt holes 57. Namely, an inner end portion of the intermediate plate is located on the cylindrical portion along the outer periphery of the cylindrical portion, a distance of the outer periphery of the cylindrical portion from the inner periphery of the cylindrical portion changing according to the thickness of the cylindrical portion. Thus, the inner-peripheral side flat portion (inner end portion) 41 has a length at the increased thickness portion greater than that at a non-increased thickness portion. Also, the inner-peripheral side flat portion (inner end portion) 41 is situated along the outer periphery of the cylindrical portion 52 within a predetermined distance less than a width of the cylindrical portion 52.

According to the structure, the folded portion 12 can prevent the combustion gas from exposing to the second metal plate 20 and the bead plate 30, so that the first metal plate 10 can be made of material which has an excellent heat resistance or corrosion resistance. The second metal plate 20 or the bead plate can be made of material which has an excellent elasticity. Accordingly, the gasket 1 can be made by a combination wherein characteristics of each material are applied. Therefore, a gasket with various kinds of excellent features such as a sealing performance, heat resistance, corrosion resistance, durability and the like, can be made.

Also, since the first half bead 22 is provided, the inner-periphery side flat portion 21 of the first half bead 22 can be easily housed inside the folded portion 12, so that a portion 21 of the second metal plate 20 can be easily inserted into the folded portion 12, even when a width of a guard portion of the cylindrical portion 52 is narrow. As a result, the elasticity of the folded portion 12 can be improved, and cracking can be prevented due to a stopping function of the insertion portion 21.

Due to the structure with the second full bead 13, when a pressing force toward the cylinder head gasket 1 increases and the first full bead 31 is pressed, the second full bead 13 can distribute the pressing force and prevent a creep relaxation of the first full bead 31.

In the invention, as shown in FIGS. 1 to 3, a position 42a on the inner peripheral side of a sloping portion of the second half bead 42 is placed to match a position 52b on the outer peripheral side (outer wall surface) of the inner cylindrical portion 12. Due to this structure, the position 42a of an angular portion of the second half bead 42 corresponds to the outer wall surface 52b of the cylindrical portion 52, so that coolant water barely enters into the upper surface of the cylindrical portion 52. Therefore, electric etching, which occurs due to low-freezing liquid coolant water on the upper surface of the cylindrical portion 52 forming the cylinder bores 51, can be prevented, and the sealing performance can be improved. Incidentally, in the cylinder head gasket 1 with the structure shown in FIGS. 1 to 3, an experimental result shows that an amount of distortion decreases approximately 12% in the average at four portions compared to a standard product made by a conventional technology.

Figure 4:
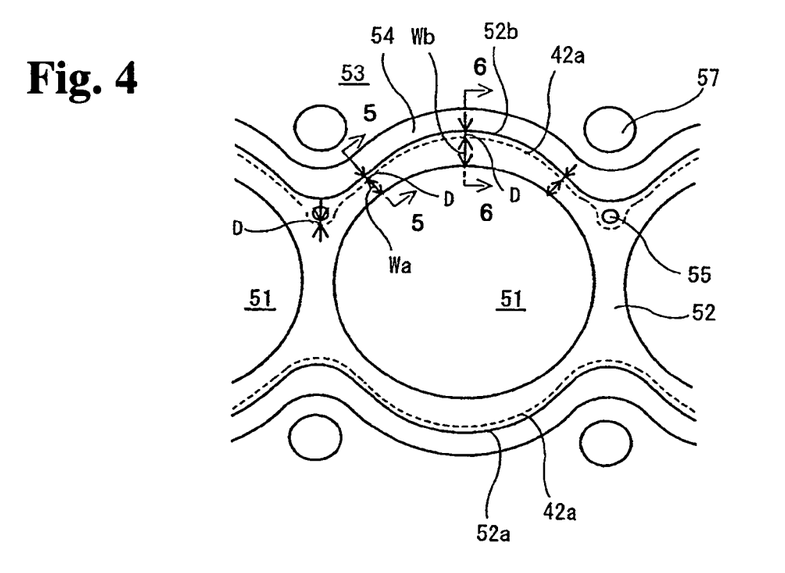
FIG. 4 is a partial top plan view of the cylinder block of the open-deck type engine for explaining the structure of the cylinder head gasket of the second embodiment of the present invention.
Figure 5:
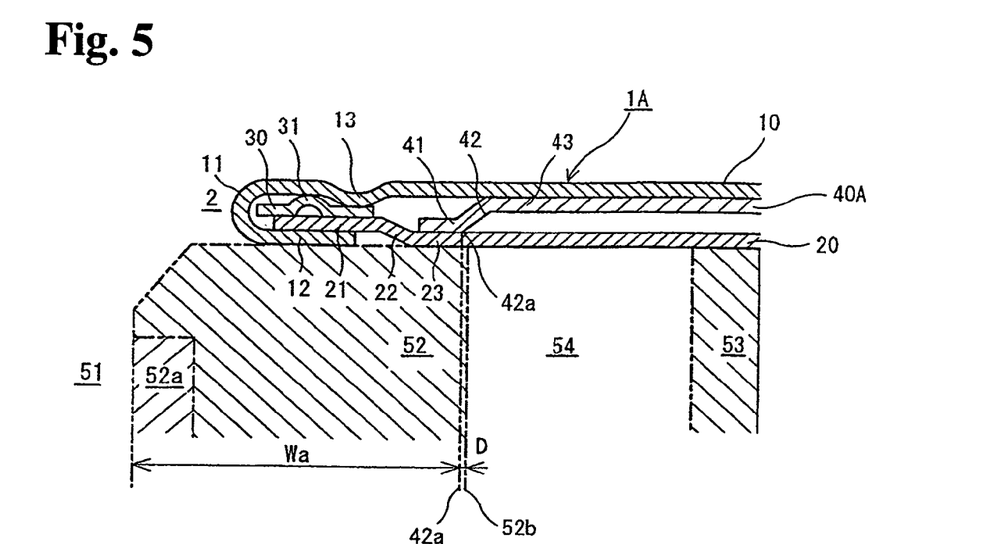
FIG. 5 is a cross sectional view taken along line 5-5 in FIG. 4 showing the cylinder head gasket of the second embodiment of the present invention.
Figure 6:
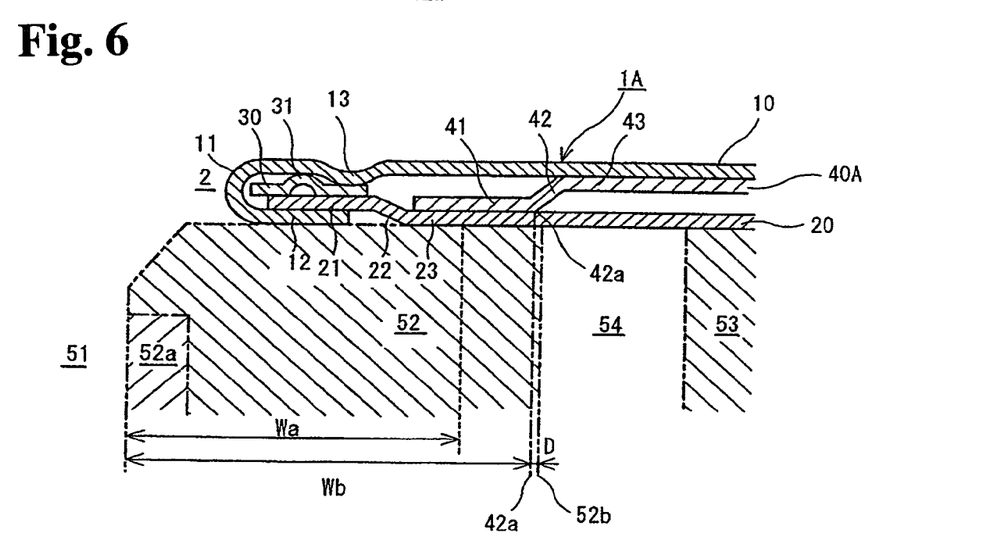
FIG. 6 is a cross sectional view taken along line 6-6 in FIG. 4 showing the cylinder head gasket of the second embodiment of the present invention.

Next, a second embodiment will be explained. As shown in FIGS. 4 to 6, the cylinder head gasket 1A of the second embodiment has the position 42a on the inner peripheral side of the sloping portion of the second half bead 42 provided in an intermediate plate 40A along the position 52b on the outer peripheral side of the inner cylindrical portion 12. More specifically, for example, with a predetermined distance D, the position (shown by dotted lines in FIG. 4) 42a on the inner peripheral side of the sloping portion of the second half bead 42 is situated at further inner peripheral side of the position 52b on the outer peripheral side of the inner cylindrical portion 12. The distance D is less than the width of the bead 42. Other structures are the same as those of the cylinder head gasket 1 of the first embodiment.

Due to this structure, the position 42a of the angular portion of the second half bead 42 is designed to be in the inner peripheral side with the predetermined distance D along the outer wall surface 52b of the cylindrical portion 52. Accordingly, a portion on the upper surface of the cylindrical portion 52, where the coolant water enters in, is limited to a very narrow area. Therefore, the electric etching, which occurs due to the anti-freezing liquid on the upper surface of the cylindrical portion 52 forming the cylinder bores 51, can be substantially prevented, and the sealing performance can be improved. Incidentally, the predetermined distance does not have to be necessarily fixed distance D, but may be changed.

Figure 7:
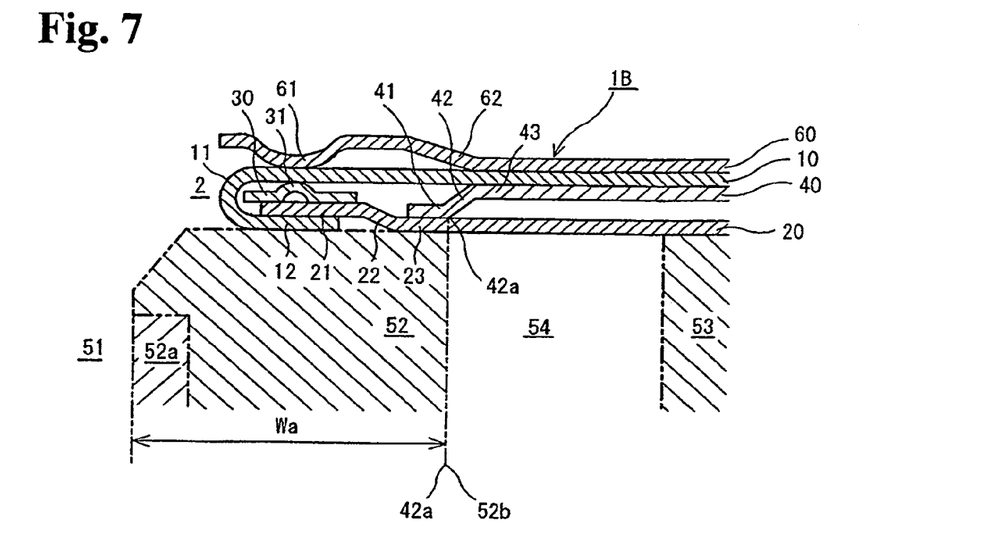
FIG. 7 is a drawing corresponding to the cross sectional view taken along line 2-2 in FIG. 1 showing the cylinder head gasket of a third embodiment of the present invention.
Figure 8:
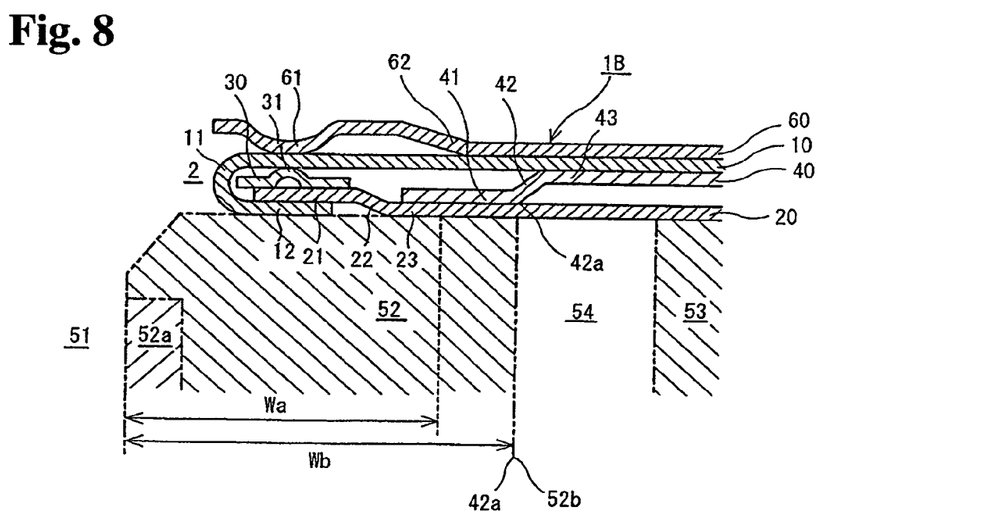
FIG. 8 is a drawing corresponding to the cross sectional view taken along line 3-3 in FIG. 1 showing the cylinder head gasket of the third embodiment of the present invention.

Next, a third embodiment will be explained. As shown in FIGS. 7, 8, a cylinder head gasket 1B of the third embodiment omits the second full bead 13 in the first metal plate 10 of the cylinder head gasket 1B of the first embodiment in FIGS. 1 to 3, and a new third metal plate 60 is laminated on the base portion of the first metal plate 10. The third metal plate 60 includes a third full bead 61 in a position facing the first full bead 31 of the bead plate 30. Moreover, a third half bead 62 is formed in a position approximately facing the second half bead 42 of the intermediate plate 40. The third full bead 61 is formed in such a way as to project to a bead plate 30 side. Also, the third half bead 62 is formed in such a way as to come close to the first metal plate 10 side as the third half bead 62 goes to the outer peripheral side from the inner peripheral side. More specifically, the third metal plate 60 abuts against base portion of the first metal plate 10 side on the outer peripheral side of the third half bead 62. Other than the above-mentioned structure, the structure of the third embodiment is the same as that of the cylinder head gasket 1 of the first embodiment.

Due to this structure, in addition to the above-mentioned operational effect of the cylinder head gasket 1 of the first embodiment, the spring performance can be improved in portions of the first full bead 31 and the second half bead 42. Incidentally, since there is no second full bead 13, the number of seal lines decreases.

Also, in the cylinder head gasket 1A of the second embodiment, a cylinder head gasket may be composed by omitting the second full bead 13 and laminating the new third metal plate 60 on the first metal plate 10, as in the third embodiment.

Figure 9:
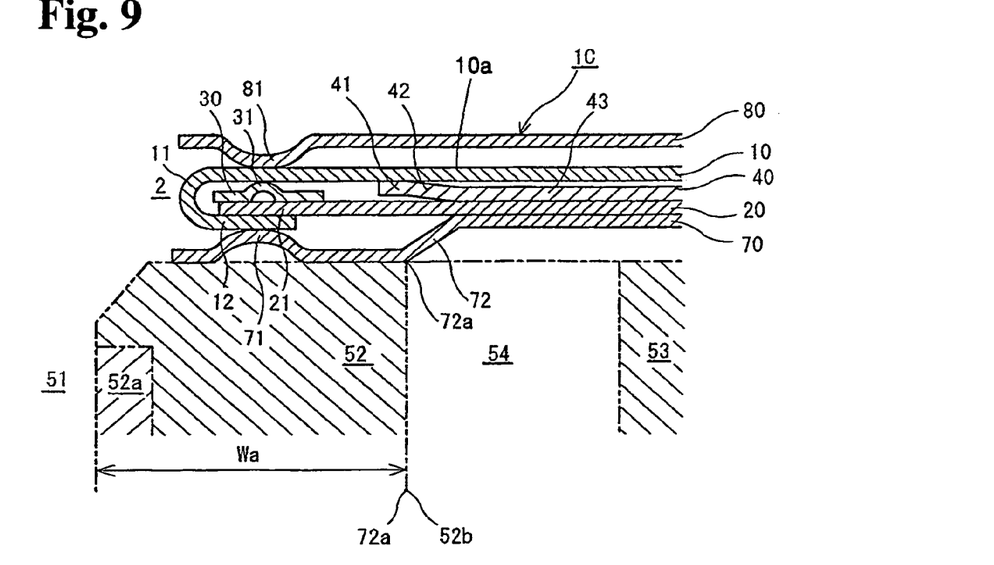
FIG. 9 is a drawing corresponding to the cross sectional view taken along line 2-2 in FIG. 1 showing the cylinder head gasket of a fourth embodiment of the present invention.
Figure 10:
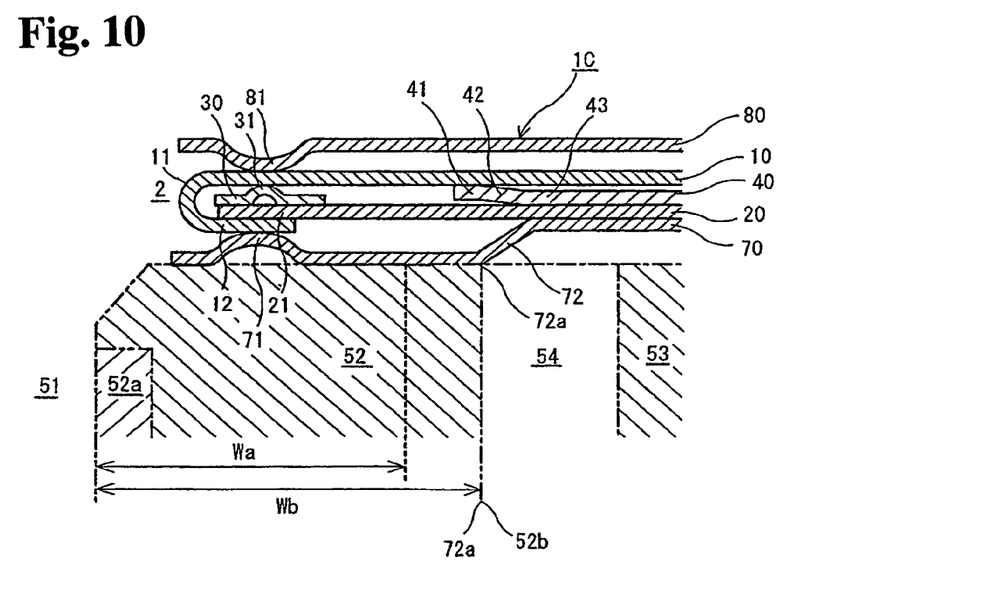
FIG. 10 is a drawing corresponding to the cross sectional view taken along line 3-3 in FIG. 1 showing the cylinder head gasket of the fourth embodiment of the present invention.

Next, the fourth embodiment will be explained. As shown in FIGS. 9, 10, a cylinder head gasket 1C of the fourth embodiment is held between the open-deck type cylinder block 50 and the cylinder head and performs a sealing function. The first metal plate 10 is folded back at the peripheral border portion of the cylinder bore 2 and forms the folded portion 12. Also, the second metal plate 20 is inserted into the folded portion 12. Inside the folded portion 12, the circular bead plate 30 is laminated between the second metal plate 20 and the first metal plate 10, and includes the first full bead 31 which projects to the first metal plate 10.

Also, the intermediate plate 40 is laminated and provided with the second half bead 42. The second half bead 42 slopes from the first metal plate 10 side to the second metal plate 20 side as the second half bead 42 goes from the inner peripheral side to the outer peripheral side on the outer peripheral side of the bead plate 30. Moreover, a fourth metal plate 70 is laminated on the folded portion 12 side of the first metal plate 10.

The fourth metal plate 70 has a fourth full bead 71 in a position facing the first full bead 31 of the bead plate 30. The fourth full bead 71 projects to the bead plate 30 side. Also, a fourth half bead 72 is provided in a position facing the second half bead 42 of the intermediate plate 40. The fourth half bead 72 slopes from the folded portion 12 side of the first metal plate 10 side to the second metal plate 20 side. Also, a fifth metal plate 80 has a fifth full bead 81 which projects to the bead plate 30 side in a position facing the first full bead 31 of the bead plate 30. By providing the fifth full bead 81, the spring performance can be improved in the portion of the first full bead 31.

A position 72a on the inner peripheral side of a sloping portion of the fourth half bead 72 is placed to match the position 52b on the outer peripheral side of the inner cylindrical portion 52 which forms the cylinder bores 51 of the cylinder block 50. Due to this structure, the position 72a of an angular portion of the fourth half bead 72 corresponds to the outer wall surface 52b of the cylindrical portion 52, so that the coolant water hardly enters into the upper surface of the cylindrical portion 52. Therefore, electric etching, which occurs due to the anti-freezing liquid on the upper surface of the cylindrical portion 52 forming the cylinder bores 51, can be prevented, and the sealing performance can be improved.

Although it is not shown in the figures, the position 72a on the inner peripheral side of the sloping portion of the fourth half bead 72 is placed along the inner peripheral side of the position 52b on the outer peripheral side of the cylindrical portion 52 which forms the cylinder bores 51 of the cylinder block 50, for example, with the predetermined distance D. Due to this structure, the portion 72a of the angular portion of the fourth half bead 72 is placed on the inner peripheral side with the predetermined distance D along the outer wall surface 52b of the cylindrical portion 52. Accordingly, the portion of the upper surface of the cylindrical portion 52 wherein the coolant water contacts is limited to a very narrow area.

Therefore, electric etching, which occurs due to the anti-freezing liquid on the upper surface of the cylindrical portion 52 forming the cylinder bores 51, can be prevented, and the sealing performance can be improved. Incidentally, the predetermined distance does not have to be necessarily fixed, but it may be changed.

Figure 11:
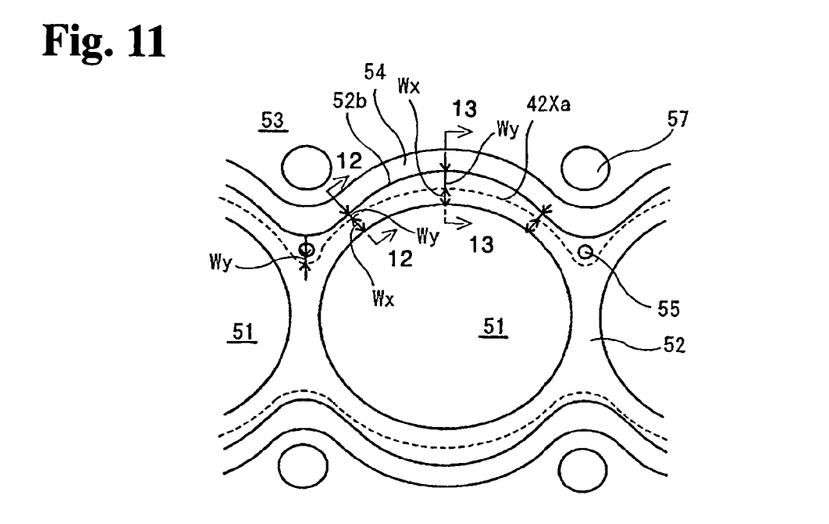
FIG. 11 is a partial top view of the cylinder block of the open-deck type engine for explaining the structure of the cylinder head gasket as a reference.
Figure 13:
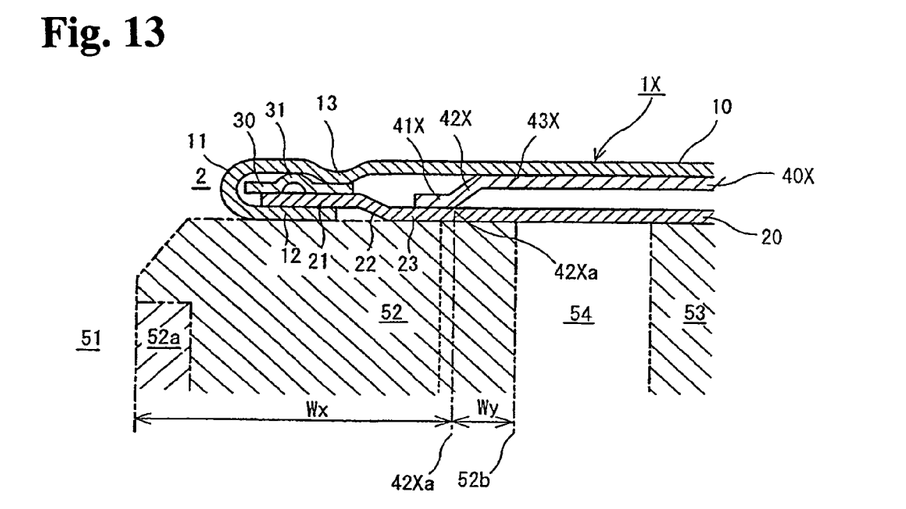
FIG. 13 is a cross sectional view taken along line 13-13 in FIG. 11 showing the cylinder head gasket as a reference.

In addition, for reference, FIGS. 11 to 13 show a cylinder head gasket 1X, wherein the position 42a of the angular portion of the second half bead 42 is placed with a predetermined distance Wx from the cylinder bore 2 without extending along the outer wall surface 52b of the cylindrical portion 52. In this structure, as shown in FIG. 11, a distance Wx+Wy between the coolant water channel 54 and the cylinder bores 51 in the cylinder block 50 changes, so that the distance Wy between the position 42a on the inner peripheral side of the sloping portion of the second half bead 42 and the position 52b on the outer peripheral side of the inner cylindrical portion 12 changes. As shown in FIGS. 11, 12, the distance Wy is small at a vicinity of the bolt holes 57. However, as shown in FIGS. 11, 13, the distance Wy becomes larger in a central part between the respective bolt holes 57, so that the coolant water enters into the upper surface of the cylindrical portion 52. Therefore, electric etching, which occurs due to the low-freezing liquid coolant water, cannot be prevented on the upper surface of the cylindrical portion 52 forming the cylinder bores 51.

Figure 14:
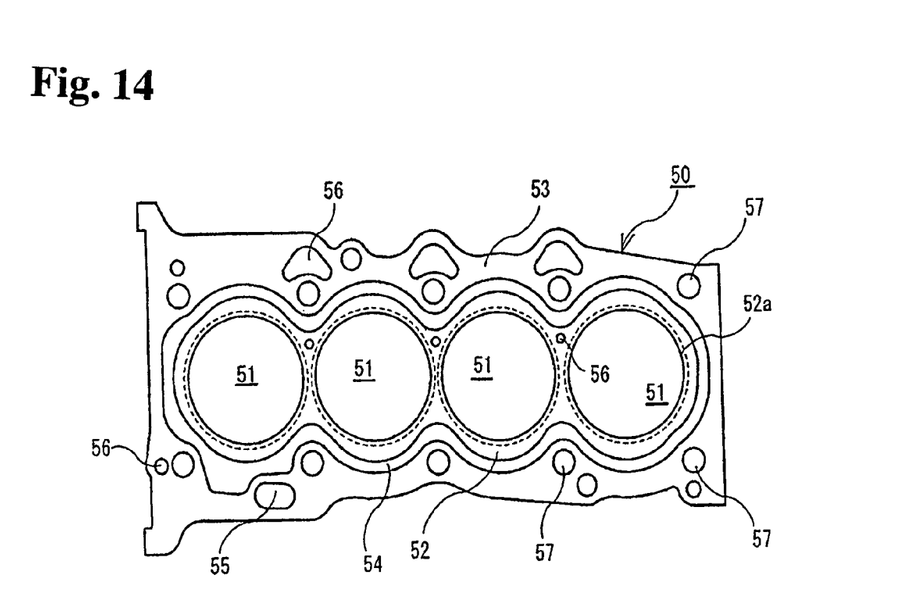
FIG. 14 is a top plan view showing an example of the cylinder block of the open-deck type engine.

FIG. 14 shows an example of an open-deck engine that includes a plurality of cylindrical portions arranged linearly and connected together. Each cylindrical portion has an increased thickness portion at a portion away from a cylindrical portion adjacent thereto.

The disclosure of Japanese Patent Application No. 2007-042213, filed on Feb. 22, 2007, is incorporated in the application.

While the invention has been explained with reference to the specific embodiments of the invention, the explanation is illustrative and the invention is limited only by the appended claims.

What is claimed is:

1. A combination, comprising:
    an open-deck engine including a cylinder block having a cylindrical portion forming a cylinder bore, a wall portion facing the cylindrical portion, and a water jacket between the cylindrical portion and the wall portion, and
    a cylinder head gasket, said cylinder head gasket comprising:
        a first metal plate having a base portion, a curved portion extending from the base portion for defining the cylinder bore of the engine, and a folded portion extending from the curved portion and located under the base portion;
        a second metal plate having an inner portion disposed on the folded portion, an outer portion outside the folded portion, and a first half bead provided between the inner and outer portions and extending radially outwardly relative to the cylinder bore in a direction away from the base portion;
        an annular bead plate provided on the inner portion of the second metal plate, and having a first full bead projecting toward the base portion; and
        an intermediate plate provided between the outer portion of the second metal plate and the base portion of the first metal plate, said intermediate plate having an inner end portion disposed on the outer portion, and a second half bead extending from an inner periphery of the inner end portion toward the base portion of the first metal plate, wherein the cylindrical portion has an outer periphery facing the wall portion, an inner periphery forming the cylinder bore, and a thickness between the inner and outer peripheries, the thickness partly changing, and wherein the inner end portion of the intermediate plate is located on the cylindrical portion along the outer periphery of the cylindrical portion, a distance of the outer periphery of the cylindrical portion from the inner periphery of the cylindrical portion changing according to the thickness of the cylindrical portion.

2. A combination according to claim 1, wherein said open deck engine includes a plurality of cylindrical portions arranged linearly and connected together, each cylindrical portion having an increased thickness portion at a portion away from a cylindrical portion adjacent thereto.

3. A combination according to claim 2, wherein the inner end portion of the intermediate plate has a length at the increased thickness portion greater than that at a non-increased thickness portion.

4. A combination according to claim 1, wherein said first metal plate further includes a second full bead provided on the base portion between the first full bead and the second half bead, and projecting to the folded portion.

5. A combination according to claim 1, wherein the inner end portion is situated along the outer periphery of the cylindrical portion within a predetermined distance less than a width of the cylindrical portion.

* * * * *

UNITED STATES PATENT AND TRADEMARK OFFICE
CERTIFICATE OF CORRECTION

| | |
|---|---|
| PATENT NO. | : 8,033,263 B2 |
| APPLICATION NO. | : 12/923700 |
| DATED | : October 11, 2011 |
| INVENTOR(S) | : Kishou Yasuda |

It is certified that error appears in the above-identified patent and that said Letters Patent is hereby corrected as shown below:

In the Specifications:

Please change column 4, line 47, "The cylindrical portion 52 and the outer wall portion"

to --The cylindrical portion 52 and the outer wall portion 53--.

Signed and Sealed this
Fourth Day of September, 2012

David J. Kappos
*Director of the United States Patent and Trademark Office*